Figure 1:
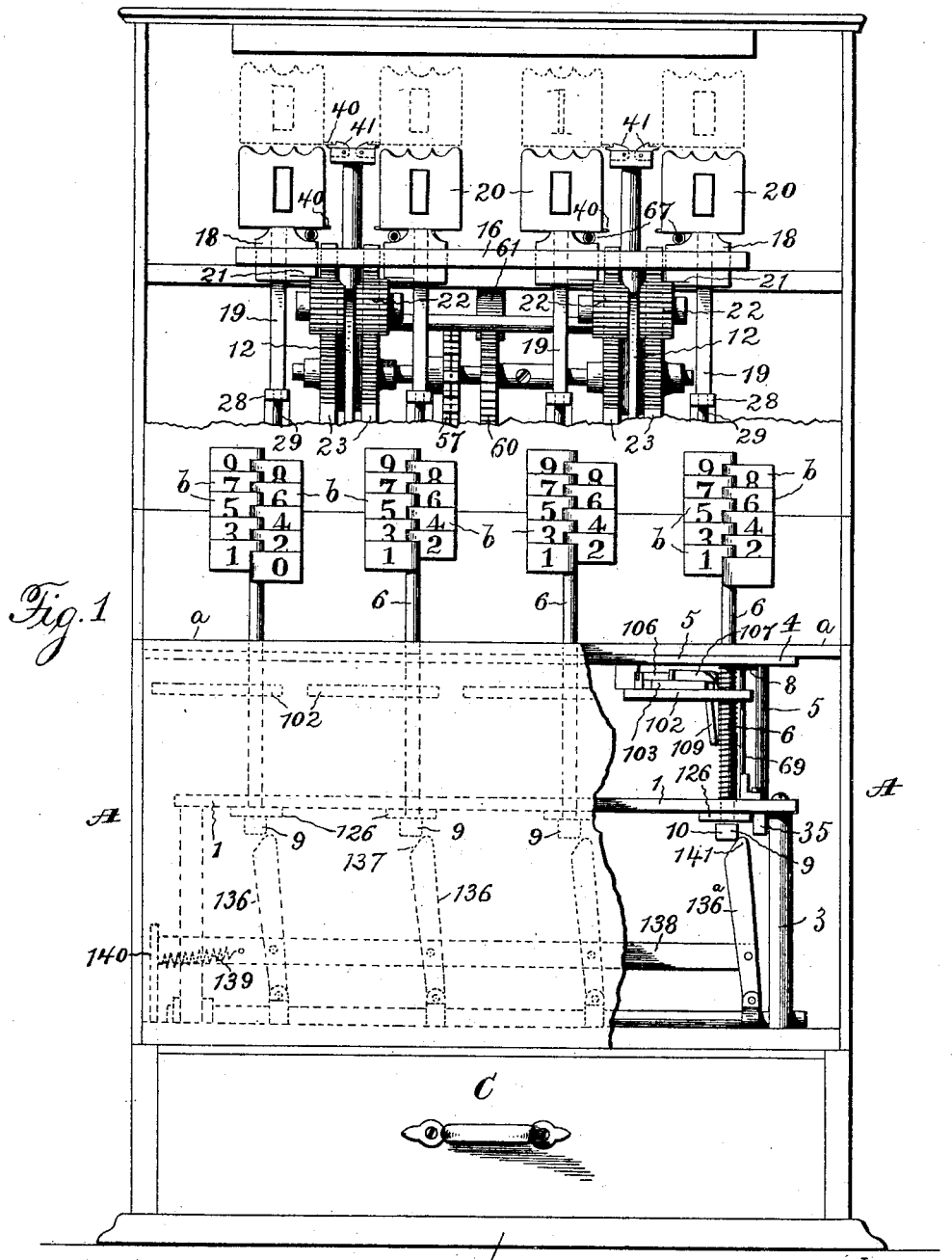

(No Model.)

H. G. WALTER.
CASH REGISTER.

No. 599,817.

9 Sheets—Sheet 2.

Patented Mar. 1, 1898.

Witnesses
Jas. E. Hutchinson.
G. F. Downing.

Inventor
H. G. Walter
By H. A. Seymour
Attorney

THE NORRIS PETERS CO., PHOTO-LITHO., WASHINGTON, D. C.

(No Model.)  9 Sheets—Sheet 3.

H. G. WALTER.
CASH REGISTER.

No. 599,817.  Patented Mar. 1, 1898.

Witnesses
Jas. Es. Hutchinson.
G. F. Downing.

Inventor
H. G. Walter
By H. A. Seymour
Attorney (No Model.)  H. G. WALTER.  9 Sheets—Sheet 4.
CASH REGISTER.

No. 599,817.  Patented Mar. 1, 1898.

(No Model.)　　　　　　H. G. WALTER.　　　9 Sheets—Sheet 5.
CASH REGISTER.

No. 599,817.　　　　　　　　　　Patented Mar. 1, 1898.

Witnesses
Jas. E. Hutchinson.
G. F. Downing.

Inventor
H. G. Walter
By H. A. Seymour
Attorney (No Model.)

H. G. WALTER.
CASH REGISTER.

No. 599,817. Patented Mar. 1, 1898.

9 Sheets—Sheet 7.

Fig. 7.

Witnesses
Jas. Es. Hutchinson.
G. F. Downing.

Inventor
H. G. Walter
By H. A. Seymour
Attorney

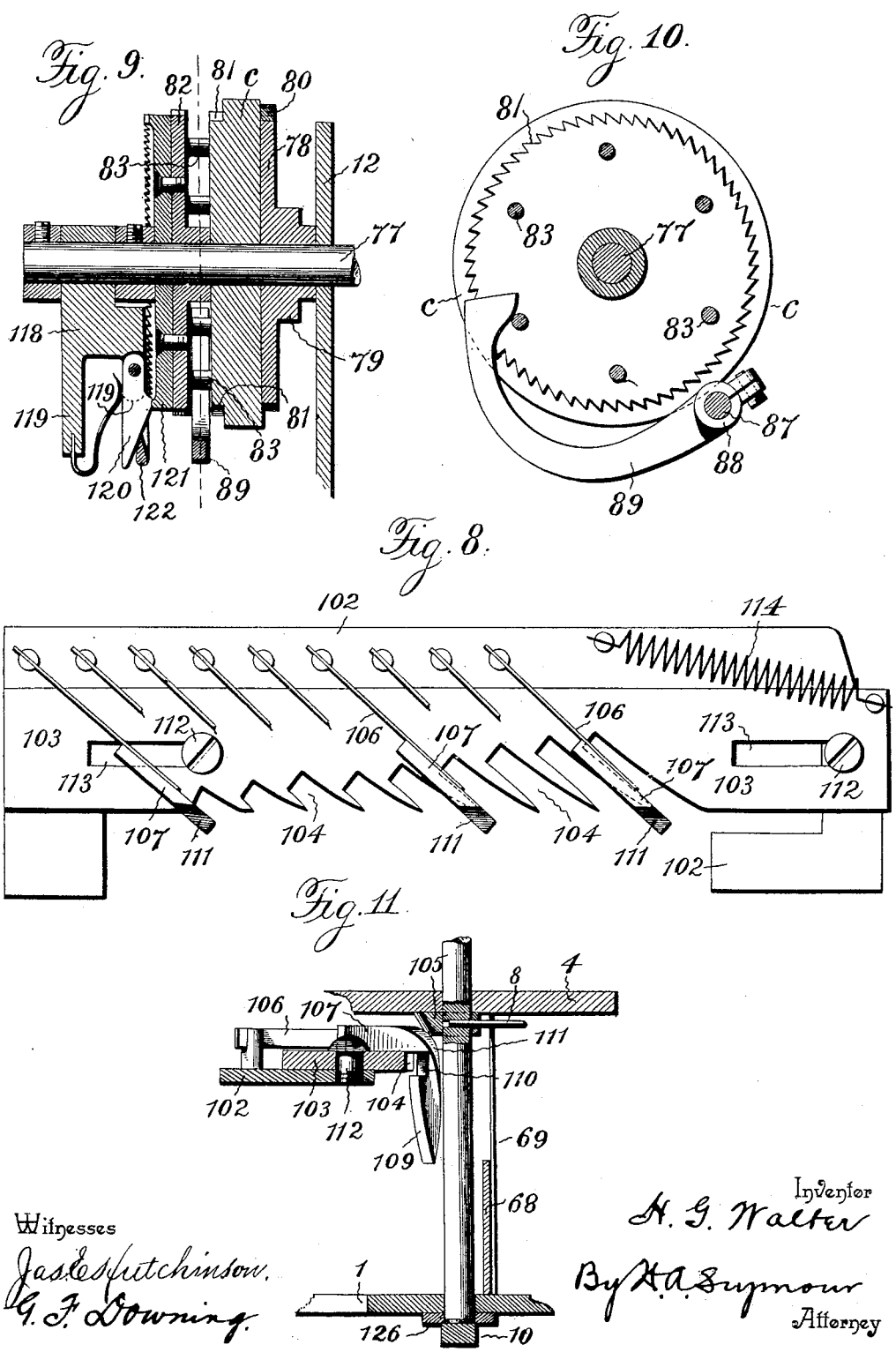

(No Model.)
H. G. WALTER.
CASH REGISTER.
No. 599,817.
9 Sheets—Sheet 9.
Patented Mar. 1, 1898.
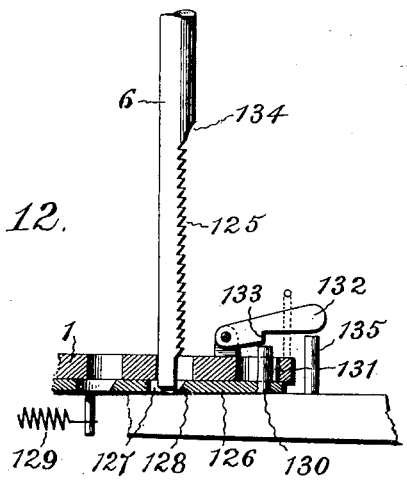
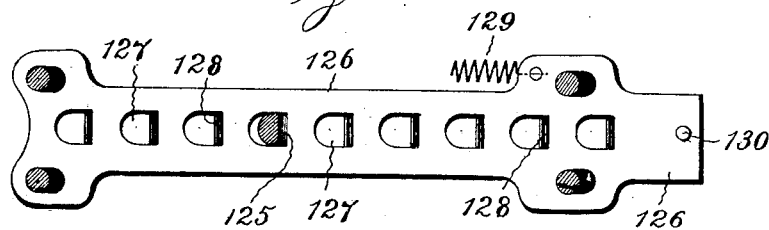
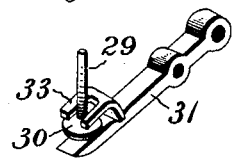
Witnesses
Jas E Hutchinson
G. F. Downing
Inventor
H. G. Walter
By H. A. Seymour
Attorney
THE NORRIS PETERS CO., PHOTO-LITHO., WASHINGTON, D. C.

UNITED STATES PATENT OFFICE.

HENRY G. WALTER, OF SCRANTON, PENNSYLVANIA, ASSIGNOR TO THE WYOMING CASH REGISTER COMPANY, OF WILKES-BARRÉ, PENNSYLVANIA.

CASH-REGISTER.

SPECIFICATION forming part of Letters Patent No. 599,817, dated March 1, 1898.

Application filed March 5, 1897. Serial No. 626,036. (No model.)

*To all whom it may concern:*

Be it known that I, HENRY G. WALTER, a resident of Scranton, in the county of Lackawanna and State of Pennsylvania, have invented certain new and useful Improvements in Cash-Registers; and I do hereby declare the following to be a full, clear, and exact description of the invention, such as will enable others skilled in the art to which it appertains to make and use the same.

My invention relates to an improvement in cash-registers such as are adapted to display targets denoting the amount of a sale and also register the amount of a sale and add the aggregate amount of sales.

The object of my invention is to improve machines of this class in various respects and render their operation more positive and accurate.

A further object is to arrange the targets in compact form and provide simple and efficient means for displaying said targets and maintaining them displayed any desired length of time.

A further object is to provide means whereby to prevent the operation of devices which unlock the drawer and display the targets until after one or more of the target-carriages have been set for the desired targets.

A further object is to provide a cash-register with simple and efficient target-setting devices.

A further object is to provide simple and accurately-operating devices for displaying the targets.

A further object is to provide effectual devices for resetting or returning targets to their normal positions.

A further object is to provide means whereby to effect the positive and accurate operation of the registering devices.

A further object is to so construct the apparatus that the registering devices will be operated and then locked in the position to which they may be set until the target raising or displaying devices are operated.

A further object is to provide positive and automatically operating stops whereby to accurately limit the movement of the registering devices when a particular key is depressed.

A further object is to provide simple devices for preventing a false register by a partial depression of a key.

A further object is to provide accurately-operating devices for transferring aggregate amounts from one registering-wheel to another.

A further object is to provide simple means for locking and unlocking the drawer.

A further object is to provide means whereby to limit the forward throw or movement of the target-carriages, whereby to insure the display of the target corresponding to the key depressed.

A further object is to provide a simple appliance for locking the levers which control the operation of the mechanism.

A further object is to provide means whereby to prevent the momentum which some parts of the mechanism acquire from moving the target-carriages farther than the proper distance to set the target corresponding to the key depressed in position to be displayed.

A further object is to produce a cash register and indicator which shall be comparatively simple in construction, accurate and positive in operation, and which shall be effectual in all respects in the performance of its functions.

With these objects in view the invention consists in certain novel features of construction and combinations and arrangements of parts, as hereinafter set forth, and pointed out in the claims.

Figure 2:
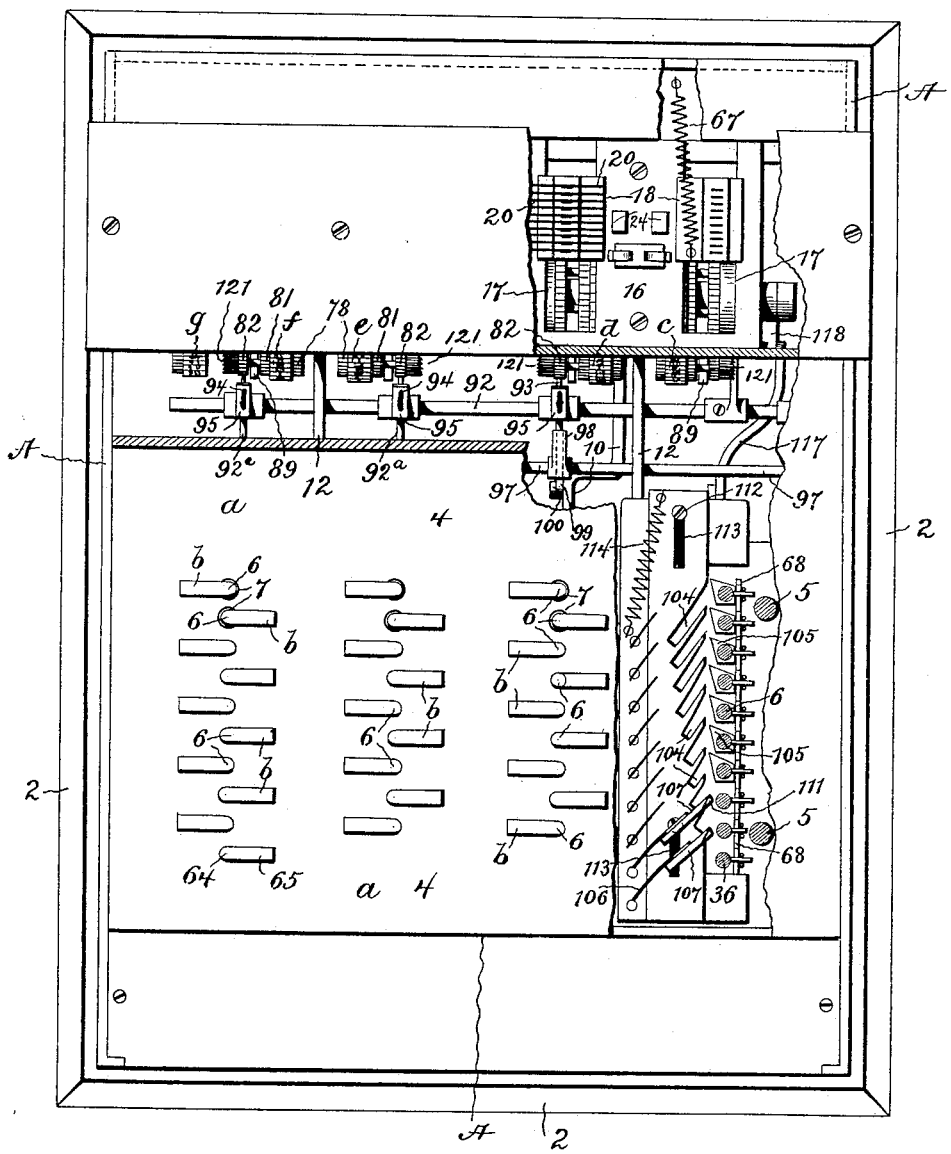
Figure 3:
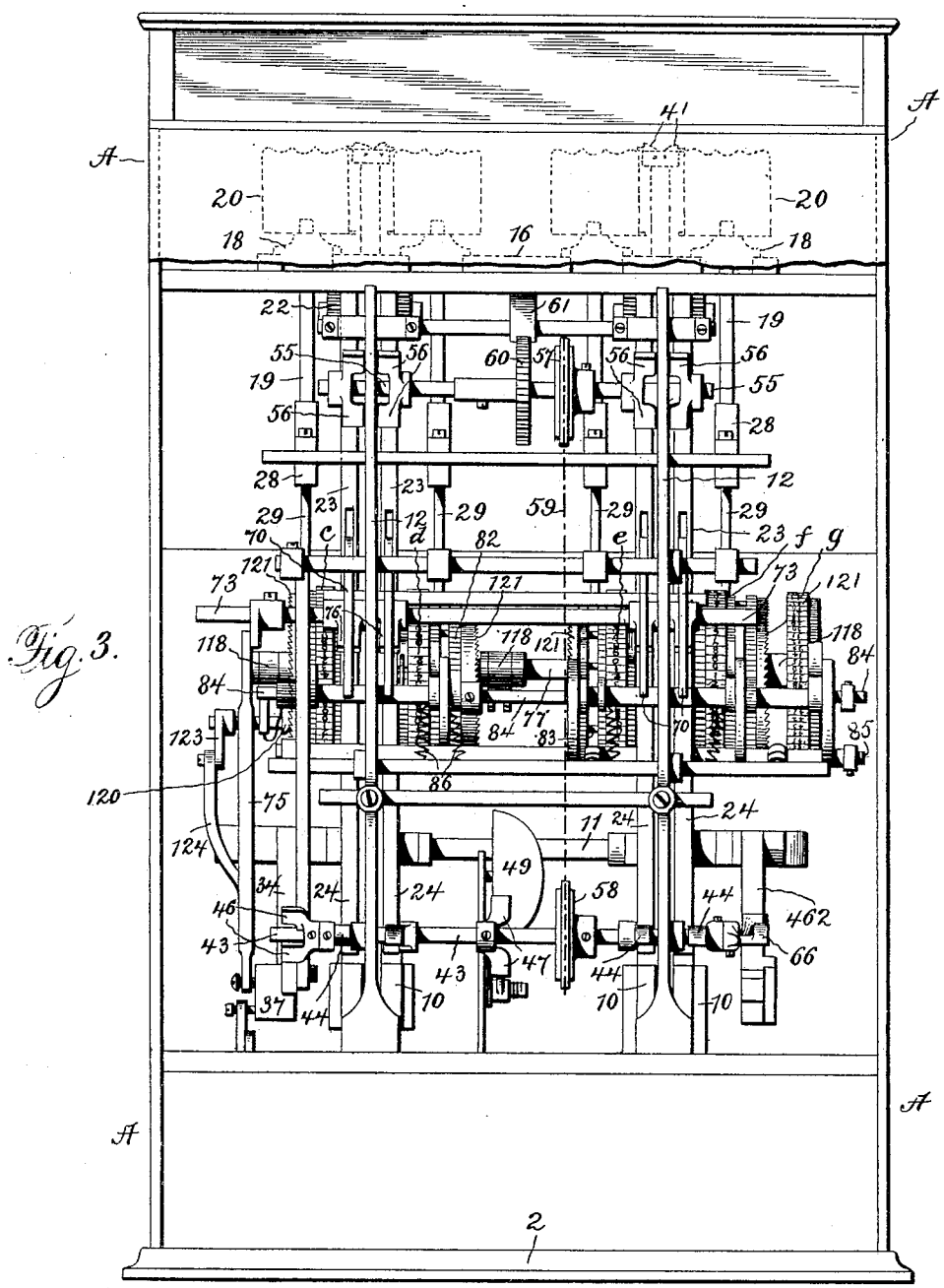
Figure 4:
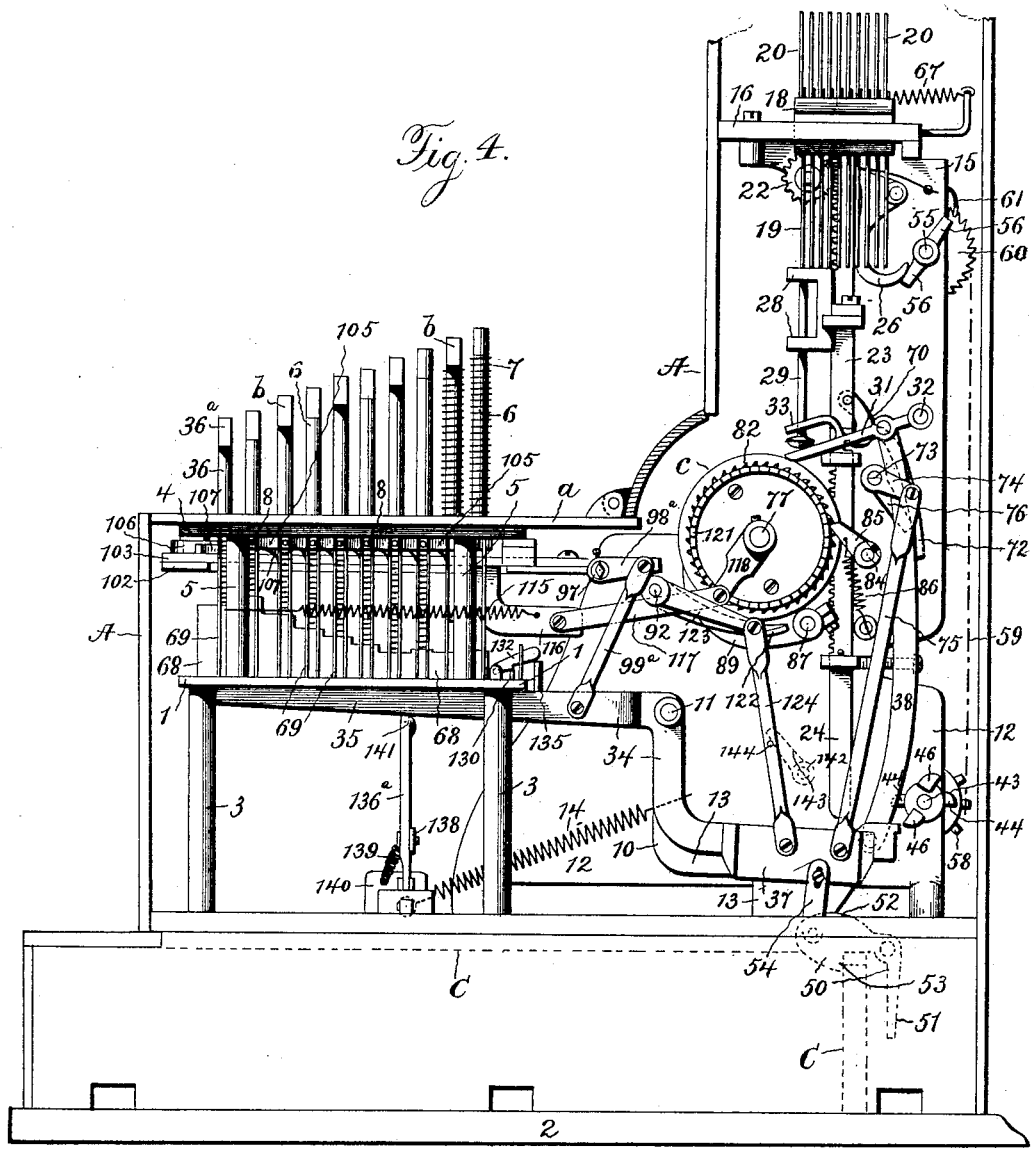
Figure 5:
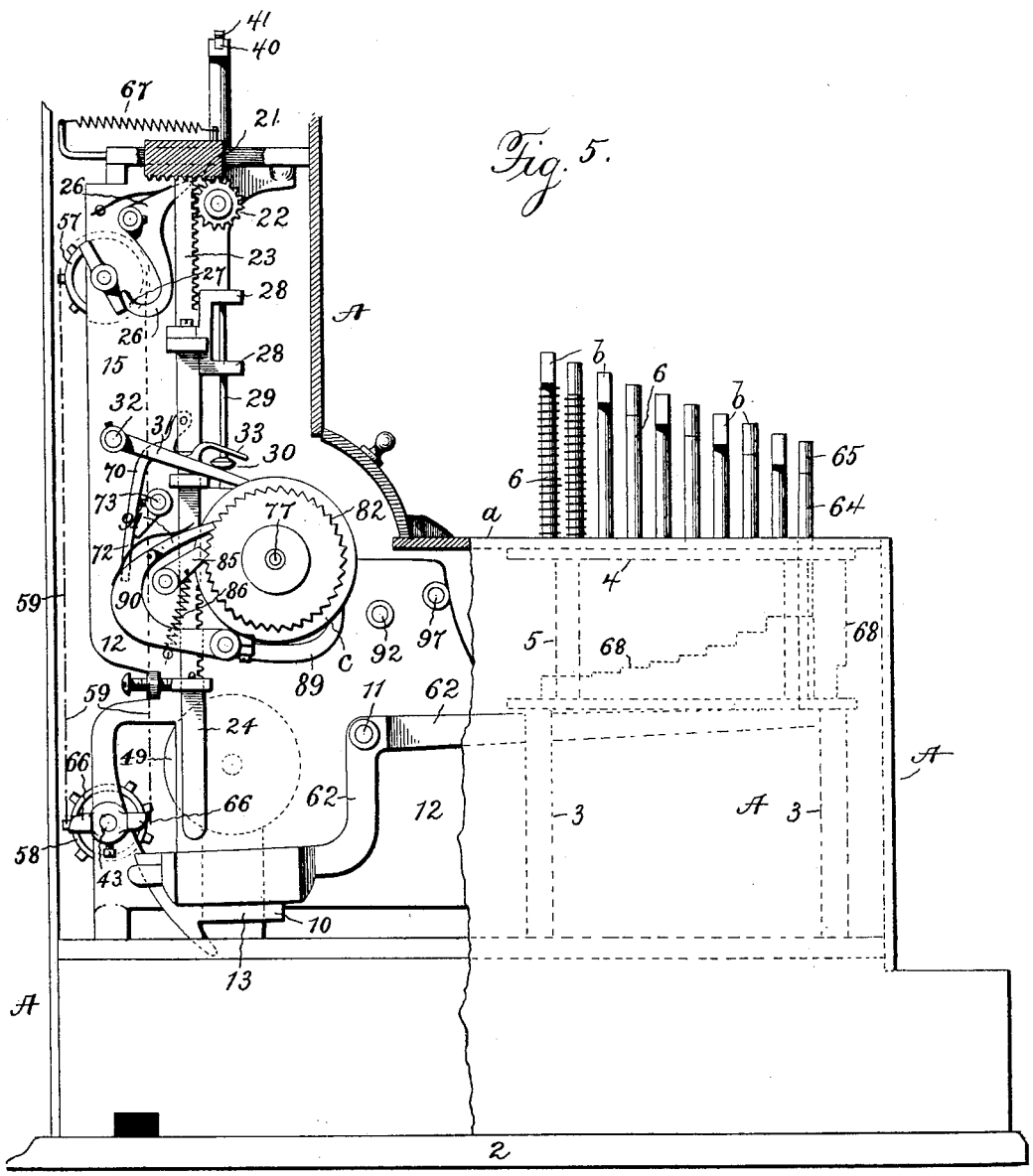
Figure 6:
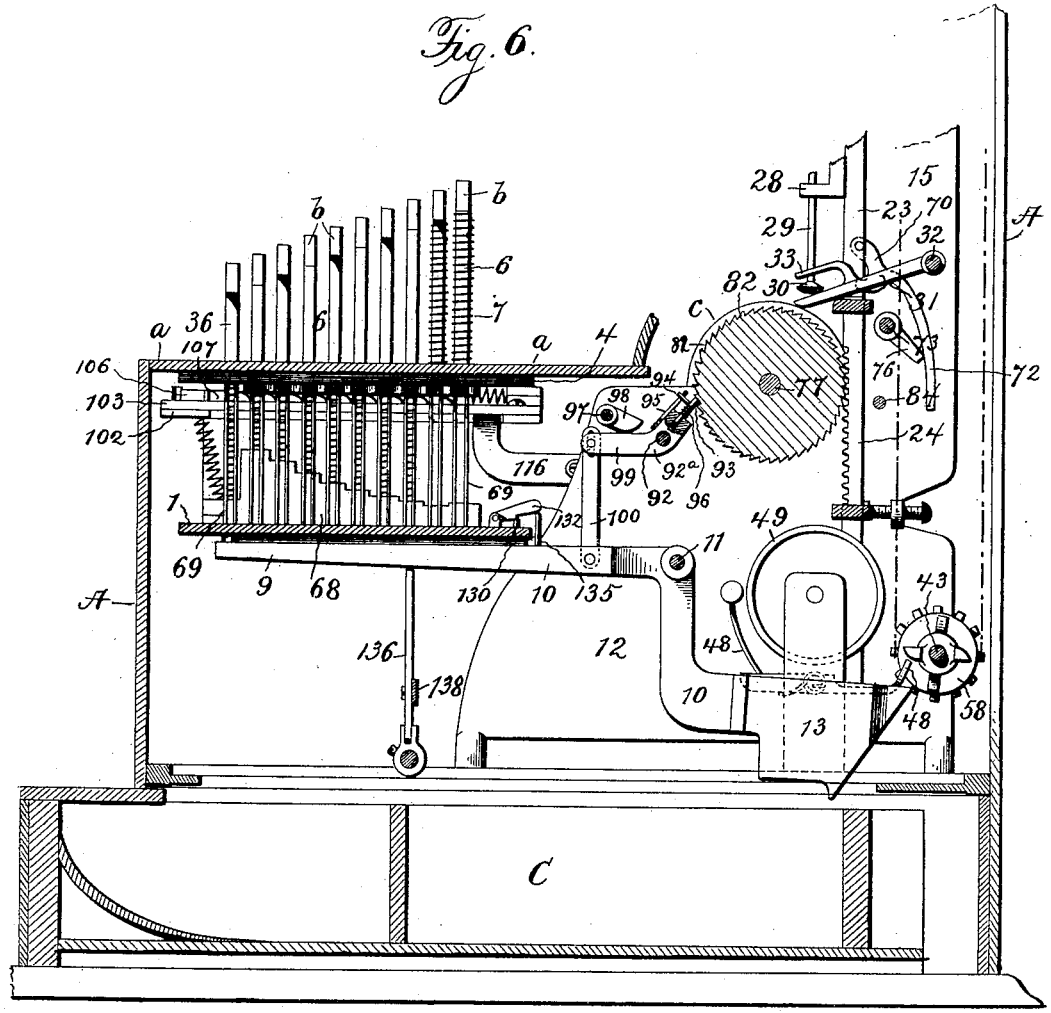

In the accompanying drawings, Figure 1 is a front elevation with a part of the casing removed, so as to show the targets and parts of the mechanism for operating the same. Fig. 2 is a plan view with parts of the casing removed. Fig. 3 is a rear view with the casing removed. Fig. 4 is a view of one of the machines with the casing removed. Fig. 5 is a similar view of the other end of the machine. Fig. 6 is a vertical sectional view. Fig. 7 is a view of one set of keys and devices which immediately coöperate therewith. Fig. 8 is a detail view of one of the graduated plates or bars and connections between the same and the registering devices. Figs. 9 and 10 are views showing details of the registering devices. Figs. 11, 12, 13, and 14 are views of various details.

A represents the casing, which may be of usual construction, and within this casing the framework of the machine is disposed and adapted to support the various parts of the mechanism. The lower part of the frame is adapted to receive and inclose the drawer C.

A plate 1 is supported some distance above the base-plate 2 of the frame by means of posts 3, and above the plate 2 another plate 4 is disposed and supported by means of posts 5, secured at their lower ends to the plate 1. The plates 1 and 4 are made with alined perforations for the accommodation of four or more rows of key-rods 6, each having a key $b$ at its upper end and each being normally sustained by means of springs 7, which may be disposed between the plates 1 to 4, so as to bear, respectively, against the bottom plate 1 and pins 8, passing transversely through said key-rods under the plate 4, said pins also serving to limit the upper movement of the key-rods; or said springs may be disposed on the key-rods between the top plate $a$ of the casing and the keys $b$. The keys $b$ are preferably made in the form of arms projecting laterally from the upper ends of the key-rods, the keys of each set projecting alternately in opposite directions, and the key-rods of each set are made of gradually-increasing lengths, so that the entire group of keys will be made in the form of an inclined bank and the figures will be placed on their vertical faces, where they can be more readily seen than if they were on the tops of the keys, but may be placed on top the keys, if desired. The several rows of keys are intended to represent, respectively, units, tens, hundreds, and thousands—that is to say, the first row represents "cents," the second row "dimes," the third row "dollars," up to ten dollars, and the fourth row represents dollars from ten to ninety. Thus, when a key of each set or row is depressed, four targets will be displayed, (in a manner hereinafter explained,) the first two figures to the left representing dollars and the two figures to the right denoting fractional parts of a dollar.

Under each set or group of key-rods one arm 9 of a pivoted lever 10 is disposed. Each lever 10 is pivotally supported intermediate of its ends on a shaft 11, passing through the uprights 12 12 of the framework. The rear arms 13 of the levers are preferably weighted, whereby to effect the return of the inner arms 9 of said levers; but in order to insure the return of the arms 9 to their normal positions under the key-rods I prefer to connect them with the framework by means of coiled springs 14.

The uprights 12 are made with upward extensions 15, on the tops of which a plate 16 is mounted, said plate having a series of transverse slots 17 for the reception of target-carriages 18. The carriages 18 are made in their sides with grooves for the reception of the walls of the slots 17, by means of which they are guided. Each carriage is provided with a series of ten vertical slots or holes through which the shanks or stems 19 of targets 20 pass freely. Each carriage 18 is also made in its under face with a rack-bar 21, to which motion is imparted by means of pinions 22, mounted on suitable studs projecting from the framework. Motion is imparted to the pinions 22 by means of vertically-movable rack-bars 23, mounted in suitable guides in the framework and passing upwardly through holes in the plate 16. Below and in line with the rack-bars 23 bars 24 are mounted in suitable guides, and each is provided with a pin adapted to limit its downward movement by engagement of the pin with a guide through which the bar passes. The bars 24 are provided with teeth, so as to constitute rack-bars for actuating the registering mechanism, as more fully explained farther on. The lower ends of the bars 24 terminate immediately over the rear arms of the levers 10, so that when the rear arm of one of said levers is raised by the depression of a key-rod engaging the inner arm 9 of said lever the coöperating rack-bar 24 will be caused to ascend, and engaging the lower end of the rack-bar 23 above it raise the latter, so as to transmit motion to the adjacent pinion 22. The motion thus imparted to the pinion 22 will be transmitted to the rack-bar on the bottom of a target-carriage and thus cause the latter to move forward to an extent sufficient to bring the target corresponding with the key which has been depressed to proper position to be raised. The target-carriage when thus moved will be locked in position by the engagement of a pivoted dog 26 with the pinion 22, one of said dogs being provided for each pinion, and each dog is provided with a hook-shaped tail or extension 27. The dogs 26 will be maintained normally in engagement with the pinions by means of suitable springs.

The lower ends of the target shanks or stems of each set terminate in the same horizontal plane, and below each set of target shanks or stems guides 28 are disposed for the accommodation of a vertically-movable rod 29. The lower end of each rod 29 is provided with a head or button 30, which rests on an arm 31, projecting from a shaft 32, mounted in suitable bearings in the framework. Each arm 31 is provided with two fingers 33, disposed at the respective sides of the rods 29 above the buttons 30, whereby to prevent said rods from binding in their guides and also to insure the return of said rods should they bind in their guides. A lever 34 is pivotally supported between its ends on one end of the shaft 11. The inner arm 35 of the lever 34 terminates under the lower end of a key-rod 36, (having a key-rod 36$^a$,) and the rear arm 37 of said lever is weighted and connected by a rod 38 with one of the arms 31 on the shaft 32. One or more of the target-carriages having been moved forward, as above explained, so thanat the shk or stem of one of the targets will be disposed over and in line with one of the rods 29, a depression of the key 36ª will cause the lever 34 to turn on its fulcrum and transmit motion through the rod 38 to the oscillatory shaft 32. All the rods 29 will thus be made to ascend, and engaging such target-shanks as may be over and in line therewith cause the targets to be raised and the figures thereon to be displayed. As the target approaches its elevated position a tooth 40 at the lower corner thereof will ride past a dog 41, pivotally supported by a post 42, and when the target has reached the limit of its upward movement the tooth 40 thereon will rest on the dog 41, and the target will thus be maintained in its elevated position. There is, of course, a dog 41 provided for each set or group of targets.

A horizontal shaft 43 is mounted in lower portions of the uprights 12 of the framework in a position slightly beyond the rear ends of the levers 10 and 34, and on this shaft arms or lugs 44 are secured in line with the levers 10 and adapted to be engaged by the cams 45 at the rear ends of said levers. Another pair of arms or lugs 46 are secured to the end of shaft 43 in line with the rear end of the lever 34. When one of the levers 10 is operated by the depression of a key to move a target-carriage, as above explained, the cam end 45 thereof will engage one of the arms or lugs 44 and turn the shaft 43, so as to bring one of the arms or lugs 46 into the path of the rear end of lever 34. Another pair of arms or lugs 47 is secured to the shaft 43 for the purpose of operating the hammer-arm 48 for a bell 49. Thus it will be seen that when a lever 10 is depressed, as above explained, one of the lugs or arms 46 will be moved into the path of the lever 34, so that when the latter is operated by the depression of the key 36ª to effect a display of the target or targets it will also turn the shaft 43, causing one of the arms or lugs 47 to first withdraw and then release the hammer-arm 48, and thus sound the bell.

Besides displaying the targets and ringing the bell the operation of the lever 34 also operates the drawer releasing and ejecting mechanism. An L-shaped lever 50 is pivotally supported by the base of the framework, so that its arm 51 will normally depend behind the drawer C. The other arm 52 of said lever 50 is made with a tooth 53 to engage the inner face of the rear end of the drawer, and the free end of said arm 52 is connected with the lever 34 by means of a link 54. From this construction it is apparent that when the lever 34 is operated the locking-lever 50 will be turned on its fulcrum and release the draw, the arm 51 of said lever at the same time engaging the rear end of the drawer and ejecting the latter.

A shaft 55 is mounted near the upper end of the extended portions of the uprights 12 and carries four pairs of arms or lugs 56, one pair for each dog 26. A sprocket-wheel 57 is secured to the shaft 55, and a similar wheel 58 is secured to the shaft 43. A sprocket-chain 59 passes over the sprocket-wheels 57 58, so that the rotation of the shaft 43 will be imparted in one direction to the shaft 55. A ratchet-wheel 60 is secured to the shaft 55 and is engaged by a dog 61, secured to the framework, whereby to prevent retrograde motion of said shaft. During the rotation of the shaft 43 by the operation of the levers 10 and 34 the shaft 55 has been turned sufficiently to bring one of each pair of arms or lugs 56 in position to engage the hooked or curved ends of the dogs 26 when the shaft 55 is further rotated. A lever 62 is pivotally mounted on the shaft 11 and terminates at its inner end under a key-rod 64, having a key 65. The rear end of the lever 62 is preferably weighted and adapted to engage one of a pair of arms or lugs 66 on the shaft 43. Assuming now that one or more of the target-carriages have been moved and one or more targets displayed and that it is desired to permit the targets to return to their normal positions, the key 65 will be depressed, so as to turn the lever 62 on its fulcrum and cause its rear end to engage one of a pair of lugs or arms 66 on the shaft 43 and effect a partial rotation of said shaft. Motion thus imparted to the shaft 43 will be transmitted through the sprocket-gearing to the upper shaft 55, causing the lugs or arms 56 to strike the hooked ends of the dogs 26 and move said dogs out of engagement with the pinions 22 and release such target-carriages as have been previously set. The target-carriages and their immediate gearing having been thus released, the carriages will be withdrawn to their normal positions by means of springs 67, and as the carriages are thus pulled back the pinions and vertical rack-bars meshing therewith will be also reset. As a target-carriage moves back to its normal position the tooth 40 on the target which has been displayed will ride off of the dog 41 which has supported it, and the target will therefore drop to its normal position.

It is of course understood that the depression of the various keys of each row or group will effect different degrees of movement of the target-carriage with which they are intended to operate, so as to bring a target over the coöperating rod 29 in accordance with the particular key which has been depressed. Each lever 10 must therefore be moved different distances by the various keys of a particular row or group, and the key-rods which engage said lever nearest its fulcrum will effect the greatest movement of said lever; but in order to insure the proper extent of movement of the key-rods, and consequently the levers 10, it is desirable to provide means for positively limiting the downward movement of said key-rods. For this purpose I provide a plate 68 for each set of key-rods, each plate 68 having graduated shoulders or steps with which the pins 8 in the key-rods engage and thus limit the downward movement of the key-rods and the consequent pivotal movement of the levers 10. To prevent possibility of the key-rods binding in their bearings, I provide vertical guide-rods 69, between which the pins 8 pass. The vertical bar 23 of each pair being pushed upwardly by the lower rack-bars 24 engaging their lower ends, there is a possibility of the momentum acquired by the upper bars 23 causing them to leave the upper ends of the bars 24 and thus effect a movement of the target-carriage beyond the desired extent and result in displaying the wrong target. To avoid this, I pivot to each upper bar 23 a latch 70, adapted to engage a shoulder 71 on the coöperating lower bar 24, said latch having an arm 72, which serves by its weight to normally maintain the two bars 23 24 locked together. Thus it will be seen that when a lever 10 is operated by the depression of a key the coöperating vertical bars 23 24 will move together, and as the lower bar cannot be moved more than a certain distance by a particular key (for reasons which will be hereinafter made apparent) the upper bar will be prevented from moving too far and the accurate setting of the target-carriage will be effected. It is desirable, however, that the lower rack-bar 24 be permitted to return to its normal position after the accurate setting of the target-carriage shall have been assured, and by permitting such return of the lower bar 24 I provide devices actuated by the lever which effects the display of the targets whereby to withdraw the latch from the lower rack-bar 24. These latch-releasing devices comprise a shaft 73, mounted in the framework and provided at one end with a crank-arm 74, to which one end of a rod or pitman 75 is pivotally attached, the other end of said rod or pitman being pivoted to the lever 34. Arms 76 are secured to the shaft 73 and normally disposed in close proximity to the arms 72 of the respective latches 70. Thus it will be seen that when the lever 34 is operated to display the target or targets motion will be transmitted to the shaft 73, and the oscillation of the latter will cause the arms 76 thereon to engage the arms 72 of the latchets 70 and move the latter out of engagement with the lower rack-bar 24, whereupon said rack-bar will be released and permitted to drop to its normal position.

The devices for setting, raising, or displaying and releasing the target having been explained, I will now proceed to describe the construction of the registering devices and the appliances for operating the same.

A horizontal shaft 77 is rigidly supported by the uprights 12 of the framework, and on this shaft a series of registering-wheels $c\ d\ e\ f\ g$ are loosely mounted, and each is provided on its periphery with figures. The first registering-wheel $c$ has several sets of figures thereon, each set counting from "0" to "9" and are intended to denote "cents." The figures on the next registering-wheel are similarly arranged and denote "dimes." The figures on the next registering-wheel are arranged in the same manner and denote "dollars." The figures on the next wheel $f$ are arranged from "0" to "9" and represent "thousands," or, in other words, the figures on this wheel denote dollars multiplied by ten. Suppose, for example, that the four wheels $c\ d\ e\ f$ are in such positions that each wheel will present the figure "9" and that all the figures "9" are in line. The register will then read "$99.99." It may be here stated that if the "9" key of each set of keys be operated before the target-raising devices are operated the targets will when raised denote "$99.99," this being the largest amount which can be denoted at one time by the targets with four sets, as shown; but the number of sets of targets, &c., can be increased to any desired extent and larger amounts of money indicated at one time, if desired.

The figures on the registering-wheel $g$ are numbered from "0" to "59" and represent hundreds of thousands, or, in other words, the figures on the wheel $g$ represent dollars multiplied by hundreds, a complete revolution of the wheel denoting six thousand dollars, ($6,000.) Suppose, for example, the wheels $c\ d\ e\ f$ are each in such position that each wheel will present the figure "9," and that all the figures "9" are in line with the figures "59" on wheel $g$, the register will then read "$5,999.99." The amounts are transferred to the wheel $g$ by means of devices similar to those by which the aggregates are transferred successively to the other registering-wheels, all of which will be described in detail farther on. The means by which the several registering-wheels $c\ d\ e\ f$ are actuated when a key is depressed being the same, a detail description of one set of these devices will suffice for all and will be described in connection with the wheel $c$.

A ratchet-wheel 78 is mounted loosely on the shaft 77 in close proximity to the registering-wheel $c$ and independently of the latter. To the ratchet-wheel 78 a toothed segment 79 is rigidly secured and adapted to receive motion from the lower rack-bar 24. A spring-pressed dog 80 is pivoted to the registering-wheel $c$ and engages the teeth of the ratchet 78, so as to cause said registering-wheel to be turned by the operation of the lower rack-bar 24, the extent to which the registering-wheel is turned being commensurate with the extent of movement of the rack-bar 24, which latter is governed by the particular key that has been operated, as above explained, so that if number "4" key of the first series should be pressed the wheel $c$ would be turned a corresponding number of points or figures denoted on its periphery.

A ratchet-wheel 81 is rigidly secured to or made a part of the registering-wheel $c$, and a short distance from the ratchet-wheel 81 another ratchet-wheel 82 is loosely mounted on the shaft 77 and connected with the ratchet-wheel 81 by means of a series of pins 83, said pins corresponding in number to the number of sets of figures on the periphery of registering-wheel.

A rod or shaft 84 is rigidly secured in the rear portion of the framework, and on this rod or shaft spring-actuated dogs 85 are mounted and adapted to engage the ratchet-wheels 82, whereby to prevent retrograde movement of the same. For the same purpose other dogs 86 are mounted on the rod or shaft 84 and adapted to engage the ratchet-wheels 81. A rod or shaft 87 is mounted in the framework at a point below the shaft 84, and on this shaft a sleeve 88 is mounted. To one end of this sleeve a curved arm 89 is secured, the free end of which terminates in the path of the pin 83 between the ratchet-wheels, so as to be operated by them. To the other end of the sleeve 88 a curved hook-shaped arm 90 is secured, and to the free end of said arm a spring-pressed dog 91 is pivoted, so as to engage the teeth of the ratchet-wheel 82 of the next set of registering devices. From this construction it will be seen that when the registering-wheel has been turned to the extent of nine figures one of the pins 83 will be in position to engage the free end of arm 89. Now when the ratchet-wheel 82 of the first set of registering devices is turned one tooth farther one of the pins 83 will engage the arm 89 and depress it, thereby raising the arm 90 at the opposite end of the sleeve 88 and causing the dog 91, carried by said arm, to move the ratchet-wheel 82 of the next set of registering devices one tooth and turn the registering-wheel $d$ to the extent of one figure. Ten units of the registering-wheel $c$ will thus be carried to and indicated on the "dimes" or "tens" wheel $d$. When the wheel $d$ shall have been turned ten points, thus aggregating one dollar, these will be added or transferred to the dollar-wheel $e$ by means of devices which are duplicates of those above described. Aggregate amounts will also be transferred to the wheels $f$ $g$ successively by means of duplicate sets of the transferring devices.

In transferring from a lower to a higher registering-wheel it is important that the operation of the parts be positive and that the higher registering-wheel be prevented from any possibility of moving forward more than a single tooth. To insure such results, the devices now to be described will be employed.

A shaft 92 is mounted in the standards 12, and on this shaft a series of arms $92^a$ are loosely secured, one of such arms being employed with each set of registering devices except the first. Each arm 92 is made with a socket for the reception of a dog 93 to engage the ratchet-wheels 82. Each dog 93 is provided with a pin 94, which enters and is guided by a slotted plate 95, secured to the arm 92. A spring 96 is placed on the dog 93 and bears at its respective ends against the pin 94 and the end of the arm 92, said spring tending to normally project the dog 93 into engagement with the ratchet-wheel 82. When a transfer is made from a lower to a higher registering-wheel, the spring-pressed dog 93, engaging the ratchet-wheel 82 of the latter, will be depressed a sufficient extent to permit said ratchet-wheel 82 and the registering-wheel secured thereto to move to the extent of one tooth; but when said wheel 82 has moved that far its further movement will be positively prevented by the dog 93, which cannot be further depressed. The ratchet-wheel 82 and parts connected therewith will thus be prevented from movement in one direction by the dog 93 (and arm to which it is connected) and in the other direction by the dogs hereinbefore described. As soon as the target-raising devices are operated, however, the arm 92 and its dog 93 will be moved so as to permit the registering devices to be again operated when another transfer is to be made. For this purpose an oscillatory shaft 97 is mounted in the framework and provided with an arm 98 to engage an extension 99 of the arm 92. The shaft 97 is provided at one end with a crank-arm 98, the free end of which is connected with the target-raising lever 34 by means of a link 99. Thus when the lever 34 is operated the shaft 97 will be oscillated, the arm 98 made to engage the extension 99 of arm 92, and thus turn the latter to release the dog 93 and permit it to engage the next tooth of the ratchet-wheel 82.

It is necessary in order to permit the operation of any set of registering devices (except the first) when a key is depressed that the dog 93 be moved entirely free of the ratchet-wheel 82. For this purpose the extension 99 of arm 92 is connected with the corresponding lever 10 by means of a link or bar, and in order that the arm 92 be not moved too far the connection between the link 100 and the extension 99 of arm 92 is made loose. When the lever 10 shall have been released and allowed to return to its normal position, the arm 92 will be returned to its normal position with the dog 93 in engagement with ratchet-wheel 82 by means of a spring 101.

In machines of this class it is a matter of much importance that the movements of the registering-wheels when a key is depressed be very accurate and that every precaution be taken to avoid any possibility of a registering-wheel being moved too far. The means which I employ whereby to insure the positive and accurate operation of the registering devices when a key is depressed will now be explained.

A plate 102 is disposed a short distance below and supported by the upper type-rod plate 4. On this plate a graduated bar or plate 103 is mounted and adapted to slide, said bar or plate 103 being made with a series of notches or recesses 104 of gradually-increasing depth from the inner to the rear end of said bar. Each key-rod is provided with a beveled lug or eccentric 105 normally disposed under the plate 4.

The horizontal members of a series of L-shaped arms or bars 107 are disposed over the graduated bar or plate 103 and are secured to and supported by means of a series of flat springs 106, the other ends of which latter are secured to the plate 102. The depending members 109 of the L-shaped arms or bars 107 are disposed parallel with the key-rods, and each member 109 is provided at its upper end with a recess 110 normally in line with one of the notches or recesses 104 in the graduated bar or plate 103. The L-shaped arms or bars 107 are each made at the juncture of its two members with a beveled shoulder 111, to be engaged by beveled lugs or eccentrics 105, secured to the key-rods. Thus it will be seen that when a key is depressed the lug or eccentric on the key-rod will engage the adjacent L-shaped arm 107 and move it in line with the adjacent slot 104 of the graduated bar or plate 103, so that when the latter is slid forward its length of movement will be regulated and controlled by the depth of the slot 104 in line with which the L-shaped arm 107 has been moved. The graduated bar or plate 103 is guided in its movements by means of pins or screws 112, secured to the plate 102 and passing through elongated slots 113 in said graduated bar or plate 103, and the latter is maintained in and returned to its normal position by means of springs 114 115.

The graduated bar or plate 103 is provided with an arm 116, to the free end of which one end of a link 117 is pivotally connected, the other end of said link being pivotally attached to the end of an arm 118, loosely mounted on one end of the shaft 77 of the registering mechanism. The arm 118 is made with ears 119, between which a spring-pressed dog 120 is pivotally mounted and adapted to engage the teeth of a ratchet-wheel 121, secured to and carried by the ratchet-wheel 82. It is of course understood that the ratchet-wheel 121, the graduated plate or bar 103, and the intermediate coöperating parts are duplicated for each set of keys and registering devices.

Now it will be seen that when a key is depressed one of the levers 10 will be turned on its fulcrum and the coöperating rack-bar 24 will be made to transmit motion to one of the registering-wheels in the manner above explained. Motion being thus imparted to the ratchet-wheel 82 of the particular set of registering devices which has been actuated, the ratchet-wheel 121 (being secured to the ratchet-wheel 82) will also be partially rotated, the extent of rotation of the wheel 121, and also of the registering-wheel, being controlled by the engagement of one of the L-shaped arms 107 with the graduated bar or plate 103, the latter serving to permit an extent of rotation of the registering-wheel in accordance with the key which has been depressed and to prevent any further movement of said registering-wheel. It is of course necessary that the graduated plate or bar 103 be released from its connection with the registering devices after the latter have been operated by the depression, as above described, and this disconnection of said plate or bar 103 from the ratchet-wheel 121 can be conveniently accomplished when the target-raising devices are operated. For this reason beveled arms 122 are secured to the shaft 92 (one for each set of registering devices) and each arm 122 is adapted to be moved under the dog 120, so as to release it from the ratchet-wheel 121. The end of the shaft 92 is provided with a crank-arm 123, to which one end of a rod 124 is pivoted, the other end of said rod being pivotally connected to the target-raising lever 34. From this construction it is apparent that when the target raising or displaying lever 34 is operated motion will be imparted to the shaft 92 to cause the arm 122 to move the dog 120 away from the ratchet-wheel 121, whereupon the graduated plate or bar 103 will be released and moved back to its normal position by the action of the springs 114 and 115, and the L-shaped arm 107 will be caused to assume its normal position by the action of the spring 106.

In order to further guard against a false registration, which might result from a partial depression of a key-rod, I provide the devices which will be next described, whereby to prevent the return of a key-rod until it shall have been fully depressed, which devices will of course be duplicated for each set or row of key-rods, Each key-rod is provided with a series of ratchet-teeth 125. A ratchet-plate 126 is movably connected to the under face of the plate 1 of the frame under each row of key-rods and provided with a row of holes 127 for the accommodation of the key-rods. One wall of each hole is made straight and beveled, as at 128, so as to engage the ratchet-teeth 125. The ratchet-plate 126 is maintained in engagement with the ratchet-teeth of the various key-rods of each set by means of a spring 129. In other words, the perforated plate 126 constitutes a series of spring-actuated dogs made of a single piece of metal and so coöperating with the key-rods that should one of the latter be partially depressed and then released it would be prevented from returning. The ratchet plate or bar 126 is provided at or near one end with a pin 130, adapted to project through and operate in a slot 131 in the plate 1. An arm 132 is pivoted to the plate 1 of the frame and provided between its ends with a tooth or shoulder 133. Each key-rod is made at the upper end of the ratchet-teeth with a shoulder 134 to engage the ratchet-plate 126 when a key-rod shall have been compressed to its full extent. Thus it will be seen that when a key-rod is not depressed to its full extent its return will be prevented by the engagement of the ratchet-teeth with the ratchet-teeth on the key-rod, but when a key-rod is depressed to its full extent the shoulder 134 on the key-rod will engage the ratchet-plate and move the latter sufficiently to permit the tooth or shoulder 133 of arm 132 to drop behind the pin 130. This movement of the ratchet-plate will suffice to move it out of engagement with the ratchet-teeth of the key-rod, and the engagement of the pin 130 with the pivoted arm 132 will serve to hold said ratchet-plate free of the key-rod and permit the free return of the latter and also the lever 10, which has been operated by said key-rod. It is of course understood that each set of key-rods will be provided with a set of ratchet devices such as above described. Each lever 10 is provided with a pin or post 135, adapted to engage the pivoted arm 132 and raise it out of engagement with the pin 130, when said lever 10 and the key-rod return to their normal positions, thus releasing the ratchet-plate 126 and permitting it to be returned to its normal position by the spring 129.

It is desirable that means be provided whereby to prevent the depression of the target raising or displaying lever 34 at the same time that one of the levers 10, which control the setting of the targets and the operation of the registers, is operated. For this purpose I provide a series of arms 136, which are pivotally supported at their lower ends, so that their upper beveled ends 137 will be disposed under the levers 10. A bar 138 is pivotally connected to the series of arms 136, and to this bar one end of a spring 139 is attached, the other end of said spring being secured to a lug 140 on the frame and serving to maintain the upper ends of the arms 136 in and return them to their normal positions. The bar 136ª, at one end of the series, is made at its upper end with a shoulder 141 to be disposed under the lever 34. From this construction and arrangement of parts it will be seen that when a lever 10 is operated by the depression of one of the key-rods it will engage the coöperating arm 136 and move all of said arms laterally, so as to cause the shoulder 141 at its upper end of the end arm 136ª to be disposed under the target-elevating lever 34, and thus prevent the depression of the latter until the lever 10, which has been depressed, returns to its normal position. When the lever 10 returns to its normal position, the spring 139 will serve to move the arms 136 to their normal positions, and thus move the end arm 136ª out of line with the lever 34, whereupon the latter can be operated to raise or display the targets.

A shaft 142 may be mounted in the framework and provided with arms 143, which when the shaft is turned can be disposed over the levers 10, 34, and 62 and serve to lock the same and prevent the operation of the machine. Normally the locking-arms 143 will be supported out of the paths of the levers 10, 34, and 62 by means of a pin 144 on the link 99.

From the above description it is apparent that when a key of one of the rods or sets is operated the target-carriages will be moved or set and the registering devices will be operated. A depression now of the key will result in the operation of the lever 34, the raising and display of the target or targets, and the release of the drawer. Should it now be desired to restore the target-carriages and targets to their normal, the operation of the lever 62 by the depression of the key will effect this result in the manner hereinbefore explained.

Various slight changes in details of construction might be resorted to without departing from the spirit of my invention or limiting its scope, and hence I do not wish to limit myself to the precise details herein set forth.

Having fully described my invention, what I claim as new, and desire to secure by Letters Patent, is—

1. In a cash-register, the combination with a frame, of a carriage mounted therein, a series of targets mounted in said carriage, a pivoted lever, gearing connected with said carriage and adapted to coöperate with said pivoted lever, a series of key-rods coöperating with said pivoted lever, an independent pivoted lever, a single key-rod coöperating with said independent pivoted lever, a pivoted finger below the targets, and a rod or bar connecting said finger with said independent lever, substantially as set forth.

2. In a cash-register, the combination with a frame, of a series of carriages mounted therein, a series of targets mounted in each carriage, a pivoted lever corresponding to each carriage, gearing between each lever and carriage, a series of key-rods coöperating with each of said pivoted levers, a series of connected pivoted fingers, an independent pivoted lever, a key-rod coöperating therewith, and a rod or bar connecting said connected series of pivoted fingers with said independent pivoted levers, substantially as set forth.

3. In a cash-register, the combination with a lever and a series of key-rods coöperating therewith, of a target-carriage gearing between said carriage and said lever, whereby to move the carriage, targets mounted in said carriage, a rod for moving a target upwardly to display it, another lever, a key-rod for imparting motion to the same, connections between said target-moving rod and said last-mentioned lever, a drawer and a drawer-releasing device connected with said last-mentioned lever, substantially as set forth.

4. In a cash-register, the combination with a key-lever and a series of key-rods for actuating the same, of a target-carriage having a rack-bar, an upright rack-bar constructed to be actuated by said key-lever, a pinion meshing with said rack-bars, a dog to engage said pinion whereby to retain the carriage in the position to which it may be moved, means for actuating said dog whereby to release the carriage and gearing and a spring for returning said carriage, substantially as set forth.

5. In a cash-register, the combination with a key-lever, a target-carriage and intermediate devices for effecting a movement of said carriage, of a dog to retain the carriage in the position to which it may be moved, a revoluble shaft, a lug or arm on said shaft, a key and devices between said key and shaft whereby to operate the same and cause the lug or arm thereon to engage said dog and permit the return of the target-carriage, substantially as set forth.

6. In a cash-register, the combination with a key-lever and a series of key-rods coöperating therewith, of a target-carriage, gearing between said target-carriage and key-lever, a dog to retain the carriage in the position to which it may be moved, a shaft, an arm or lug on said shaft to engage said dog to release the carriage, another shaft, gearing between said shafts and a key-lever constructed to actuate the last-mentioned shaft to effect the release of the target-carriage, substantially as set forth.

7. In a cash-register, the combination with a frame and a slotted plate thereon, of a target-carriage mounted to slide in said slotted plate, a key-lever, gearing between said carriage and key-lever for propelling the carriage when the key-lever is operated, a lock for the carriage, means for operating the lock to release the carriage and a spring attached at one end to said carriage and at the other end to the frame for returning said carriage, substantially as set forth.

8. In a cash-register, the combination with a target-carriage, a series of targets mounted in said carriage, a tooth on each target, a post and a dog pivoted to said post and adapted to receive and support the targets when raised, substantially as set forth.

9. In a cash-register, the combination with a series of target-carriages, a series of key-levers, and gearing between said key-levers and carriages for operating the latter, of dogs for retaining said carriages in the positions to which they may be moved, a shaft in proximity to said dogs, arms on said shaft for engaging said dogs, means for preventing retrograde movement of said shaft, another shaft, arms thereon, a key-lever to engage said last-mentioned arms and gearing between said shafts, substantially as set forth.

10. In a cash-register, the combination with a target-carriage, means for moving the same by the depression of a key and a series of targets mounted in said carriage, each target having a stem, of a vertically-movable rod, a button at the lower end of said rod, a pivoted arm constructed to engage said button, fingers projecting from said arm and over said button, a key-lever and a connection between said key-lever and pivoted arm, substantially as set forth.

11. In a cash-register, the combination with a key-lever, and a target-carriage having a rack-bar, of a pinion meshing with said rack-bar, a key-lever, two vertically-disposed bars between said key-lever and pinion, the upper bar being adapted to transmit motion to said pinion, a hooked arm pivoted to the upper bar and constructed to engage the lower bar whereby to prevent excessive movement of the upper bar independently of the lower bar, and means for operating said hooked arm whereby to release the lower bar after the target-carriage shall have been set, substantially as set forth.

12. In a cash-register, the combination with a target-carriage, a registering device and a key-lever, of two bars, one above the other, the upper bar being constructed to impart motion to the target-carriage and the other bar being constructed to actuate the registering device and both of said bars being adapted to be moved by the key-lever, a device for locking said bars together when they are moved upwardly and means for operating said locking device to release the lower bar, substantially as set forth.

13. In a cash-register, the combination with target-carriages, a key-lever corresponding to each carriage and intermediate connections between said target-carriages and key-levers for effecting a movement of said carriage when the key-levers are operated, of dogs for holding the carriages in the position to which they may be moved, a shaft carrying arms to engage said dogs to release the carriages, a second shaft geared with the first, a special key-lever, arms on the second shaft to be engaged by special lever, devices connected with said special lever whereby to raise the targets, and a bell constructed to be sounded when said second shaft is operated by said special lever, substantially as set forth.

14. In a cash-register, the combination with a series of key-levers, a series of key-rods for each key-lever, and a series of target-carriages corresponding with the number of key-levers and carrying targets, one for each key-rod, of actuating devices between said key-levers and target-carriages, a series of dogs engaging said actuating devices, two shafts gearing connecting said shafts, arms on one of said shafts to engage said dogs, arms on the other shaft, a special key-lever to engage said last-mentioned arms, whereby to turn both shafts and actuate said dogs to release one or more carriages, and springs for returning said carriages, substantially as set forth.

15. In a cash-register, the combination with target-carriages, moving devices therefor and target-raising devices, of a key-lever for each set of carriage-moving devices, a series of keys for each key-lever, a single key-lever for operating all of said target-raising devices simultaneously and a special key for said single key-lever, substantially as set forth.

16. In a cash-register, the combination with target-carriages and means for moving the same, and target-raising devices, of a key-lever for each set of carriage-moving devices, a single key-lever for operating all the target-raising devices, a drawer, a locking and releasing device for said drawer and connections between said drawer locking and releasing device and the target-elevating key-lever, substantially as set forth.

17. In a cash-register, the combination with a series of key-rods each having ratchet-teeth, of a spring-actuated ratchet-bar common to all of said key-rods, means for moving said ratchet-bar out of engagement with a key-rod and locking it in such position, whereby to permit the return of a key-rod after it has been fully depressed, and means for releasing said ratchet-bar when the key-rod shall have returned to its normal position, substantially as set forth.

18. In a cash-register, the combination with a series of key-rods, each having ratchet-teeth, of a spring-actuated ratchet-bar common to all of said key-rods, and a shoulder at the upper end of the ratchet-teeth of each key-rod, constructed and adapted to engage the ratchet-bar and move it out of engagement with the ratchet-teeth of a key-rod when the latter shall have been depressed to its full extent, substantially as set forth.

19. In a cash-register, the combination with a series of key-rods, each having ratchet-teeth, of a spring-actuated ratchet-bar common to all of said key-rods, a pin on one end of said ratchet-bar, a gravity-latch, a shoulder on each key whereby to move the ratchet-bar out of engagement with a key-rod and so as to permit the gravity-latch to engage said pin when a key-rod shall have been depressed to its full extent, and means for raising said gravity-latch to release the ratchet-bar when a key-rod shall have returned to its normal position, substantially as set forth.

20. In a cash-register, the combination with a series of key-rods, each having ratchet-teeth, and a key-lever to be actuated by said key-rods, of a spring-actuated ratchet-bar common to all of said key-rods, a pin on said ratchet-bar, a latch, a shoulder on each key-rod adapted to move the ratchet-bar out of engagement with a key-rod and so as to permit the latch to engage said pin when the key-rod shall have been fully depressed, and a pin or projection on the key-lever adapted to engage said latch to release the ratchet-bar when the key-rod reaches its normal position, substantially as set forth.

21. In a cash-register, the combination with a frame, a series of key-rods and a key-lever coöperating with said key-rods, of means for permitting the respective key-rods to be moved different distances, a pin in each key-rod adapted to limit the upward movement thereof, a guide through which pins are adapted to pass and springs on the key-rods bearing, respectively, against said pins and the frame substantially as set forth.

22. In a cash-register, the combination with a series of key-levers, target-carriages, intermediate connections between said key-levers and target-carriages whereby to effect the setting of said target-carriages, target-raising devices, and a key-lever for operating said target-raising devices, of means for preventing the depression of the target-raising key-lever, simultaneously with the depression of a target-carriage-setting key-lever, substantially as set forth.

23. In a cash-register, the combination with a series of target-carriages, a series of key-levers coöperating therewith for setting the target-carriages, target-raising devices and a key-lever for operating said target-raising devices, of a series of pivoted arms under the key-levers, a rod or bar connecting said arms, said arms being so constructed and arranged that when a target-carriage-setting key-lever is depressed, it will engage one of said pivoted arms and move all of said arms out of line with said carriage-setting key-levers and cause one of them to be moved under the target-raising key-lever, whereby to prevent the depression of the latter simultaneously with the depression of the former, and a spring for maintaining said pivoted arms in and returning them to their normal positions, substantially as set forth.

24. In a cash-register, the combination with key-levers, of a set of registering devices coöperating with each key-lever, each set of registering devices having a wheel with figures thereon, pins carried by the respective sets of registering devices, a shaft, a sleeve mounted on said shaft, an arm secured to one end of said sleeve and adapted to be engaged by said pins, and a dog connected with the other end of said sleeve and adapted to engage the adjacent set of registering devices to move the latter one point when said arm is actuated by one of the pins of the first set of registering devices, substantially as set forth.

25. In a cash-register, the combination with a series of registering devices, each comprising a registering-wheel and a ratchet-wheel, key-lever for each set of registering devices, intermediate operating devices between the registering devices and key-levers, and means for transferring amounts from a lower to a higher registering-wheel, of an arm, and a spring-actuated dog carried by said arm and adapted to engage the ratchet-wheel of the higher registering device, whereby to prevent the higher registering-wheel from moving more than a single point when a transfer is made from a lower registering device, substantially as set forth.

26. In a cash-register the combination with two or more sets of registering devices, each comprising a registering-wheel and a ratchet-wheel, a key-lever for each set of registering devices, intermediate operating mechanism between the sets of key-registering devices and the key-levers, and means for transferring amounts from a lower to a higher registering-wheel, of a pivoted arm, a spring-pressed dog carried by said arm and adapted to engage the ratchet-wheel of the higher registering devices whereby to prevent the higher registering-wheel from moving more than one point when a transfer is made from a lower to a higher registering-wheel, means for resetting said arm and dog after the transfer shall have been made, substantially as set forth.

27. In a cash-register, the combination with two or more sets of registering devices, each comprising a registering-wheel and a ratchet-wheel, a key-lever for each set of registering devices, intermediate operating mechanism between the key-levers and registering devices and means for transferring amounts from a lower to a higher registering-wheel, of a pivoted arm, a spring-actuated dog carried by said arm and adapted to engage the ratchet-wheel of the higher registering devices, whereby to prevent the latter from being moved more than a single point when a transfer is made from a lower to a higher registering-wheel, means for releasing said dog after a transfer has been made, and connections between said pivoted arm and the key-lever of the coöperating registering devices, whereby to move the pivoted arm and dog away from the ratchet-wheel of the registering devices when said key-lever is operated to actuate the registering devices, substantially as set forth.

28. In a cash-register, the combination with two or more sets of registering devices, key-levers, means actuated by the key-levers for operating the same and devices for transferring amounts from a lower to a higher set of registering devices, a pivoted arm, a spring-actuated dog carried by said pivoted arm and adapted to engage the higher registering devices so as to prevent the latter from moving more than a single point when a transfer is made from a lower registering device, an extension on said pivoted arm and a link connecting said extension with a key-lever, substantially as set forth.

29. In a cash-register, the combination with a registering device, a key-lever, intermediate operating mechanism between said key-lever and registering devices, and a series of key-rods adapted to coöperate with said key-lever, of stop devices coöperating with said key-rods and constructed and adapted to limit the movement of the registering devices in accordance with the key-rod depressed, substantially as set forth.

30. In a cash-register, the combination with a registering device, a key-lever, intermediate operating mechanism between the key-lever and registering devices and a series of key-rods coöperating with the key-lever and adapted to move the same different distances, of stop devices between the registering devices and the key-rods for limiting the movement of the registering devices in accordance with the key-rod depressed, said stop devices being under the control of the key-rods, and means for releasing said stop devices after a register shall have been made, substantially as set forth.

31. In a cash-register, the combination with a registering device, a key-lever, intermediate operating devices between said key-lever and a registering device and a series of key-rods coöperating with said key-lever and adapted to be moved different distances, of a ratchet-wheel carried by the registering devices, an arm adapted to be moved by said ratchet-wheel, and a device under the control of the key-rods for limiting the movement of said device and thus limit the movement of the registering device in accordance with the key-rod depressed, substantially as set forth.

32. In a cash-register, the combination with a registering device, a key-lever, intermediate operating devices between said key-lever and registering device and a series of key-rods coöperating with said key-lever and adapted to be moved different distances, of a graduated, slotted bar or plate coöperating with said rods and connected with the registering devices so as to limit the movement of the latter in accordance with the key-rod depressed and means for releasing said graduated, slotted bar or plate from the registering device after a registration shall have been made, substantially as set forth.

33. In a cash-register, the combination with a registering device, a key-lever, intermediate operating devices between said key-lever and registering device, and key-rods coöperating with said key-lever and adapted to move the same different distances, of a sliding plate or bar having graduated slots or notches corresponding respectively with the key-rods, spring-actuated arms or dogs constructed and adapted to be moved in line with said graduated slots or notches by the operation of the key-rods, and connections between said slotted or notched bar or plate and the registering device whereby to limit the movement of the latter in accordance with the key-rod depressed, substantially as set forth.

34. In a cash-register, the combination with a registering device, a key-lever, intermediate operating devices between said registering device and key-lever, and a series of key-rods constructed to move the key-lever different distances, of a sliding plate or bar having graduated slots or notches corresponding respectively with the key-rods, a series of spring-actuated arms or dogs corresponding in number with graduated slots or notches in said sliding plate, a lug or eccentric on each key-rod to engage said arms or dogs and move them in line with the slots or notches of said sliding plate or bar, means for locking said sliding bar or plate with the registering device whereby to limit the movement of the latter in accordance with the key-rod depressed, and means for unlocking said plate or bar from the registering device after a registration shall have been made, substantially as set forth.

35. In a cash-register, the combination with a registering device, a key-lever, intermediate operating devices between the registering device and the key-lever and a series of key-rods coöperating with the key-lever to move the latter different distances, of a sliding spring-actuated plate having graduated slots or notches, spring-actuated arms or dogs constructed and adapted to be moved in line with the slots or notches of the sliding plate upon the depression of the key-rods, a ratchet-wheel on the registering devices, a pivoted arm connected with said sliding plate, a dog carried by said pivoted arm and adapted to engage the ratchet-wheel, and a device constructed and adapted to move said dog away from the ratchet-wheel whereby to release the sliding plate or bar, substantially as set forth.

36. In a cash-register, the combination with a registering device and a ratchet-wheel connected therewith, of a key-lever constructed to effect the operation of said registering device, key-rods for moving said key-lever different distances, a pivoted arm, a dog carried by said arm and adapted to engage said ratchet-wheel, devices coöperating with the key-rods and connected with said pivoted arm whereby to limit the movement of the registering device when said key-lever is operated, a beveled arm, and a key-lever connected with said beveled arm whereby to cause the latter to engage said dog and move it out of engagement with said ratchet-wheel to release said pivoted arm and the devices connected therewith, after a registration has been made, substantially as set forth.

37. In a cash-register the combination with movable target-carriages, targets carried by said carriages and having depending stems, and registering devices of a series of key-levers, devices coöperating with said key-levers to set the target-carriages and actuate the registering devices, key-rods adapted to move the key-levers different distances, devices coöperating with the key-rods for limiting the operation of the registering devices, a special key-lever, target-raising devices coöperating with said special key-lever, and devices operated by said special lever for releasing the registering devices from the devices which limit their movement, substantially as set forth.

38. In a cash-register, the combination with target-carriages, targets carried by said carriages, registering mechanism, key-levers coöperating with said carriages and registering devices, target-raising devices, drawer locking and releasing devices, a special key-lever coöperating with said target-raising devices and drawer locking and releasing devices, another key-lever coöperating with the target-carriages to release them, a shaft over all of said key-levers, arms on said shaft to lock all of said levers and means for normally supporting said arms out of line of movement of said key-levers, substantially as set forth.

In testimony whereof I have signed this specification in the presence of two subscribing witnesses.

HENRY G. WALTER.

Witnesses:
LAWRENCE WALTER,
D. B. REPLOGLE.